(12) United States Patent
Heo et al.

(10) Patent No.: US 11,366,359 B2
(45) Date of Patent: Jun. 21, 2022

(54) OPTICAL FILM AND LIQUID CRYSTAL DISPLAY DEVICE COMPRISING THE SAME

(71) Applicant: SKC CO., LTD., Gyeonggi-do (KR)

(72) Inventors: Young Min Heo, Gyeonggi-do (KR); Sechul Lee, Gyeonggi-do (KR); Jung Won Yu, Gyeonggi-do (KR); Seungwon Lee, Gyeonggi-do (KR); Jung Kyu Lee, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 89 days.

(21) Appl. No.: 16/160,464

(22) Filed: Oct. 15, 2018

(65) Prior Publication Data

US 2019/0113809 A1    Apr. 18, 2019

(30) Foreign Application Priority Data

Oct. 17, 2017    (KR) .......................... 10-2017-0134490

(51) Int. Cl.
*G02F 1/1335* (2006.01)
*G02F 1/13363* (2006.01)
(Continued)

(52) U.S. Cl.
CPC ........ *G02F 1/133634* (2013.01); *C08L 27/12* (2013.01); *G02B 1/14* (2015.01);
(Continued)

(58) Field of Classification Search
CPC ........ G02F 1/133528; G02F 1/133634; G02F 2201/50; G02F 2201/54; G02F 2413/04; G02F 2413/11; G02F 2413/13; G02F 2202/40; G02F 1/13363; G02B 1/10; G02B 1/14; G02B 5/30; G02B 5/3083;
(Continued)

(56) References Cited

U.S. PATENT DOCUMENTS

2010/0060827 A1\* 3/2010 Kim ..................... G02B 5/3083
349/96
2011/0151229 A1\* 6/2011 Morita .................... C08L 33/16
428/220

(Continued)

FOREIGN PATENT DOCUMENTS

JP    2010-265396    11/2010
JP    2010265396 A  * 11/2010
(Continued)

OTHER PUBLICATIONS

Office Action by the Korean Intellectual Property Office dated Sep. 27, 2018.
Office Action issued by Japanese Patent dated Jan. 21, 2020.
Pre-Appeal Examination Report issued by the Japanese Patent Office dated Sep. 17, 2021.

*Primary Examiner* — Eli D. Strah
(74) *Attorney, Agent, or Firm* — IP & T Group LLP

(57) ABSTRACT

Embodiments relate to an optical film and a liquid crystal display device comprising the same. More specifically, the embodiments relate to an optical film that is excellent in optical characteristics and has no polarization unevenness since it comprises a base layer that has a low in-plane retardation and a low thickness direction retardation and has an excellent adhesiveness by virtue of a proper level of surface tension, a process for preparing the same, and a liquid crystal display device comprising the same.

12 Claims, 3 Drawing Sheets

(51) Int. Cl.
  *G02B 1/14* (2015.01)
  *C08L 27/12* (2006.01)
  *G02B 5/30* (2006.01)
  *B29C 48/00* (2019.01)

(52) U.S. Cl.
  CPC ..... *B29C 48/0018* (2019.02); *B32B 2457/202* (2013.01); *C09K 2323/03* (2020.08); *C09K 2323/035* (2020.08); *G02B 5/30* (2013.01); *G02F 1/133528* (2013.01); *G02F 2201/50* (2013.01); *G02F 2201/54* (2013.01); *G02F 2202/40* (2013.01); *G02F 2413/04* (2013.01); *G02F 2413/13* (2013.01)

(58) Field of Classification Search
  CPC . G02B 1/04; C08L 27/12; C08L 33/12; C08L 101/04; C09K 2323/03; C09K 2323/035; B32B 2457/202; B29C 48/0018; C08J 5/18; C08J 2333/12; C08J 2427/16; C08J 7/04
  See application file for complete search history.

(56) References Cited

U.S. PATENT DOCUMENTS

| | | | |
|---|---|---|---|
| 2013/0052434 A1 | 2/2013 | Asahi et al. | |
| 2015/0362798 A1* | 12/2015 | Kwon | G02B 1/14 428/1.5 |
| 2016/0215132 A1* | 7/2016 | Zheng | C08L 33/08 |
| 2017/0058088 A1* | 3/2017 | Kamiyama | C08J 7/0427 |

FOREIGN PATENT DOCUMENTS

| | | | | |
|---|---|---|---|---|
| JP | 2011-242754 A | 12/2011 | | |
| JP | 2013-241556 A | 12/2013 | | |
| JP | 2014-083703 A | 5/2014 | | |
| JP | 2014-193982 A | 10/2014 | | |
| JP | 2015-188772 A | 11/2015 | | |
| JP | 2016-105175 A | 6/2016 | | |
| JP | 2017-145388 A | 8/2017 | | |
| KR | 1020120071696 | 7/2012 | | |
| KR | 101222363 | 1/2013 | | |
| KR | 101462579 | 11/2014 | | |
| WO | WO-2006016667 A1 * | 2/2006 | | G02B 1/08 |
| WO | 2016/047796 A1 | 3/2016 | | |

* cited by examiner

OPTICAL FILM AND LIQUID CRYSTAL DISPLAY DEVICE COMPRISING THE SAME

The present application claims priority of Korean patent application number 10-2017-0134490 filed on Oct. 17, 2017, which is incorporated herein by reference in its entirety.

TECHNICAL FIELD

Embodiments relate to an optical film and a liquid crystal display device comprising the same. More specifically, the embodiments relate to an optical film that is excellent in optical characteristics and has no polarization unevenness since it comprises a base layer that has a low in-plane retardation and a low thickness direction retardation and has an excellent adhesiveness by virtue of a proper level of surface tension, a process for preparing the same, and a liquid crystal display device comprising the same.

BACKGROUND ART

The advent of the information age has prompted development and commercialization of various display devices including liquid crystal displays (LCD), plasma display panels (PDP), electrophoretic displays (ELD), and the like. Display devices for indoor uses have become larger in size and thinner in thickness, and portable display devices for outdoor uses have become smaller in size and lighter in weight. Various optical films have been employed in order to further enhance the functions of such displays.

In general, in a polarizing plate, a protective film is attached to one side or both sides of a polarizer made from polyvinyl alcohol in order to protect the polarizer. Polyethylene terephthalate (PET) films have been used as such a protective film for a polarizer. But polyethylene terephthalate films have a problem that the anisotropy thereof increases as the stretch ratio increases.

As an alternative to the above, triacetyl cellulose (TAC) films that have such properties as a high transmittance, optical isotropy, defectless surface, and the like, have been widely used. Specifically, Korean Patent No. 1222363 discloses a film for improving curling of a polarizing plate, wherein the main component thereof is a cellulose ester, and the film has an in-plane retardation of 30 nm to 300 nm and a thickness direction retardation of 80 nm to 400 nm.

However, triacetyl cellulose films are disadvantageous in that they are expensive, do not have a variety of sources, and are vulnerable to moisture. Hence, protective films for a polarizer of various materials capable of replacing the triacetyl cellulose films have been developed. For example, cycloolefin polymers (COP), acrylic resins, polyester resins, or the like are used alone or in combination thereof.

DISCLOSURE OF THE INVENTION

Technical Problem

Acrylic films may be considered as an alternative for triacetyl cellulose films. But they are disadvantages in terms of the processability due to the brittle characteristic thereof. If acrylic resins are prepared by copolymerization of other comonomers in order to address this issue, there would be a problem that the manufacturing costs increase.

Accordingly, an embodiment aims to provide an optical film, which has a low in-plane retardation and a low thickness direction retardation so that no polarization unevenness occurs; compensates the disadvantage of brittle acrylic resins; and has excellent interfacial adhesiveness in a laminated structure by virtue of proper surface characteristics.

Solution to the Problem

According to an embodiment, there is provided an optical film, which comprises a base layer comprising a fluorine-based resin and an acrylic resin in a weight ratio of 1:9 to 1:99, wherein the base layer has an in-plane retardation ($R_o$) of 10 nm or less, a thickness direction retardation ($R_{th}$) of 50 nm or less, and a surface tension of 40 dynes/cm to 60 dynes/cm.

According to another embodiment, there is provided a process for producing an optical film, which comprises (1) melt extruding a resin composition comprising a fluorine-based resin and an acrylic resin to prepare an unstretched sheet; (2) stretching the unstretched sheet by 2 to 3 times in the longitudinal direction and by 3 to 4 times in the transverse direction to produce a stretched film; and (3) heat setting the stretched film to produce a base layer, wherein the resin composition comprises the fluorine-based resin and the acrylic resin in a weight ratio of 1:9 to 1:99, and the base layer has an in-plane retardation ($R_o$) of 10 nm or less, a thickness direction retardation ($R_{th}$) of 50 nm or less, and a surface tension of 40 dynes/cm to 60 dynes/cm.

According to still another embodiment, there is provided a liquid crystal display device, which comprises a backlight unit and a liquid crystal panel, wherein the liquid crystal panel comprises an upper polarizing plate, a liquid crystal cell, and a lower polarizing plate in sequence, the upper polarizing plate and the lower polarizing plate each comprise a polarizer and protective films for a polarizer disposed on both sides of the polarizer, and at least one of the protective films for a polarizer is an optical film according to the above embodiment.

Effects of the Invention

The optical film according to the embodiments has excellent processability since the disadvantage of brittle acrylic resins is compensated, has a low in-plane retardation and a low thickness direction retardation so that no polarization unevenness occurs, and has a proper level of surface tension, which enables an additional layer to be readily laminated or coated on the surface thereof.

In addition, the liquid crystal display device, which comprises the optical film according to the embodiments, may use various light sources other than a white LED.

EXPLANATION OF REFERENCE NUMERALS

Figure 1:
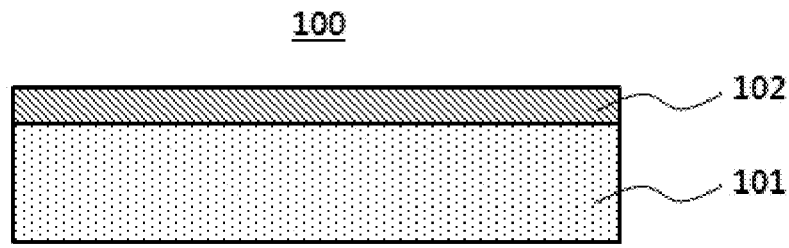
FIGS. 1 and 2 each are a cross-section of an optical film according to the embodiments.

100: optical film
101: base layer
102, 103: primer coating layer
A: liquid crystal display device
10: liquid crystal panel
20: backlight unit
100-1, 100-2, 100-3, and 100-4: protective film for a polarizer
110, 120: polarizer
130: liquid crystal cell

BEST MODE FOR CARRYING OUT THE INVENTION

Throughout the description of the embodiments, in the case where each film, membrane, panel, or layer is mentioned to be formed "on" or "under" another film, membrane, panel, or layer, it means not only that one element is directly formed on or under another element, but also that one element is indirectly formed on or under another element with other element(s) interposed between them. Also, the term "on" or "under" with respect to each element may be referenced to the drawings. For the sake of description, the sizes of individual elements in the appended drawings may be exaggeratingly depicted and do not indicate the actual sizes.

Optical Film

The optical film according to an embodiment comprises a base layer comprising a fluorine-based resin and an acrylic resin in a weight ratio of 1:9 to 1:99, wherein the base layer has an in-plane retardation ($R_o$) of 10 nm or less, a thickness direction retardation ($R_{th}$) of 50 nm or less, and a surface tension of 40 dynes/cm to 60 dynes/cm.

The base layer comprises a mixed resin obtained by blending a fluorine-based resin and an acrylic resin. Thus, the disadvantage of an acrylic resin having a negative birefringence and poor processability due to its brittle characteristic can be compensated by the fluorine-based resin having a positive birefringence and a low hardness. The base layer, therefore, has excellent processability and has a low in-plane retardation and a low thickness direction retardation so that no polarization unevenness is observed.

The base layer comprises the fluorine-based resin and the acrylic resin in a weight ratio of 1:9 to 1:99. Specifically, the base layer may comprise the fluorine-based resin and the acrylic resin in a weight ratio of 1:9 to 1:20, 1:10 to 1:20, or 1:15 to 1:20. If the mixing ratio of the fluorine-based resin and the acrylic resin is within the above range, it is possible to prevent poor processability that may be caused by the brittle characteristic of the acrylic resin, and the base layer may have a proper level of retardation for an optical film.

The base layer may have a thickness of 100 μm or less. Specifically, the base layer may have a thickness of 20 μm to 80 μm.

Fluorine-Based Resin

The fluorine-based resin may be a polymer containing fluorine. Specifically, the fluorine-based resin may be at least one selected from the group consisting of an ethylene-tetrafluoroethylene (ETFE) copolymer, a polyvinylidene fluoride (PVDF) homopolymer or copolymer, a tetrafluoroethylene-hexafluoropropylene (FEP) copolymer, a tetrafluoroethylene-hexafluoropropylene-vinylidene fluoride (THV) copolymer, and a polychlorotrifluoroethylene (PCTFE or PTFCE) copolymer.

More specifically, the fluorine-based resin may be at least one selected from the group consisting of an ethylene-tetrafluoroethylene (ETFE) copolymer, a polyvinylidene fluoride (PVDF) homopolymer or copolymer, and a tetrafluoroethylene-hexafluoropropylene (FEP) copolymer. Even more specifically, the fluorine-based resin may be a polyvinylidene fluoride (PVDF) homopolymer or copolymer.

In the case where the polyvinylidene fluoride (PVDF) is a copolymer resin, vinylidene fluoride (VF2) and a comonomer may be copolymerized in a weight ratio of 50:50 to 99:1.

The comonomer may be a fluorinated monomer. Specifically, the comonomer may be at least one selected from the group consisting of vinyl fluoride; trifluoroethylene (VF3); chlorotrifluoroethylene (CTFE); 1,2-difluoroethylene; tetrafluoroethylene (TFE); hexafluoropropylene (HFP); a perfluoro(alkyl vinyl) ether such as perfluoro(methyl vinyl) ether (PMVE), perfluoro(ethyl vinyl) ether (PEVE), and perfluoro(propyl vinyl) ether (PPVE); perfluoro(1,3-dioxol); and perfluoro(2,2-dimethyl-1,3-dioxol) (PDD). More specifically, the comonomer may be at least one selected from the group consisting of chlorotrifluoroethylene (CTFE), hexafluoropropylene (HFP), trifluoroethylene (VF3), and tetrafluoroethylene (TFE).

The fluorine-based resin may have a viscosity of 100 to 2,500 Pa·s, specifically 500 to 2,000 Pa·s, as measured by a capillary flow meter under the conditions of a shear rate of 100 $s^{-1}$ and 230° C., in order to be suitable for extrusion and injection molding.

In addition, the fluorine-based resin may have a weight average molecular weight of 50,000 g/mole to 250,000 g/mole, 100,000 g/mole to 250,000 g/mole, or 200,000 g/mole to 240,000 g/mole.

Further, the fluorine-based resin may have a melting index (MI) of 5 g/10 min to 20 g/10 min or 5 g/10 min to 10 g/min at 230° C.

Further, the fluorine-based resin may have a glass transition temperature of −40° C. to −20° C. or −37° C. to −28° C.

The fluorine-based resin may be employed in an amount of 1% by weight to 10% by weight, 2% by weight to 8% by weight, or 3% by weight to 7% by weight, based on the total weight of the mixed resin of the fluorine-based resin and the acrylic resin.

Acrylic Resin

The acrylic resin may be a homopolymer. The homopolymer may have at least one substituent. Otherwise, the homopolymer may have no substituent.

Specifically, the acrylic resin may be a poly(methyl methacrylate) (PMMA) resin, a poly(ethyl (meth)acrylate) resin, a poly(propyl (meth)acrylate) resin, a poly(butyl (meth) acrylate) resin, or a poly(pentyl (meth)acrylate), each of which may have at least one substituent. In this text, the term "(meth)acrylate" means either "methacrylate" or "acrylate".

More specifically, the acrylic resin may be a poly(methyl methacrylate) (PMMA) resin. The PMMA resin may have at least one substituent. Otherwise, the PMMA resin may have no substituent.

For example, the substituent may be a functional group, but it is not particularly limited.

The acrylic resin may have a melting index (MI) of 1 g/10 min to 20 g/10 min, 1 g/10 min to 10 g/10 min, or 1 g/10 min to 5 g/10 min, at 230° C.

The acrylic resin may have a softening point of 100° C. or higher. Specifically, the acrylic resin may have a softening point of 100° C. to 120° C., 105° C. to 120° C., or 105° C. to 113° C.

The acrylic resin may be employed in an amount of 90% by weight to 99% by weight, 92% by weight to 98% by weight, or 93% by weight to 97% by weight, based on the total weight of the mixed resin of the fluorine-based resin and the acrylic resin.

Retardation

The base layer has an in-plane retardation ($R_o$) of 10 nm or less and a thickness direction retardation ($R_{th}$) of 50 nm or less.

For example, the thickness direction retardation ($R_{th}$) and the in-plane retardation ($R_o$) of the base layer may be 0 or more, respectively, wherein the ratio of $R_{th}/R_o$ may be 0.1 to 40, 0.1 to 10, 0.4 to 10, or 0.4 to 5.

In addition, the base layer may have an in-plane retardation ($R_o$) of 0.1 nm to 10 nm, 0.5 nm to 4 nm, or 0.5 nm to 3.5 nm, and a thickness direction retardation ($R_{th}$) of 1 nm to 40 nm, 1 nm to 20 nm, 1 nm to 10 nm, or 1 nm to 5 nm.

As an example, the base layer may have an in-plane retardation ($R_o$) of 0.1 nm to 10 nm and a thickness direction retardation ($R_{th}$) of 1 nm to 40 nm, wherein the ratio of $R_{th}/R_o$ may be 0.1 to 40.

The in-plane retardation ($R_o$) is a parameter defined by a product of the anisotropy ($\Delta n_{xy}=|n_x-n_y|$) of refractive indices of two mutually perpendicular axes on a film and the film thickness d (nm), which is a measure of the degree of optical isotropy and anisotropy. Here, the refractive indices may be values at a wavelength of 550 nm. For example, the in-plane retardation ($R_o$) may be defined by the following Equation 1:

$$R_o = (n_x - n_y) \times d \quad \text{[Equation 1]}$$

In the above equation, $n_x$ is the refractive index in the x-axis direction in the film plane, $n_y$ is the refractive index in the y-axis direction perpendicular to the x-axis in the film plane, and d is the thickness (nm) of the film.

The base layer may have an in-plane retardation ($R_o$) of 3 nm or less under the condition of a light incident angle of −50° to 50°. Specifically, the base layer may have an in-plane retardation ($R_o$) of 0 nm to 3 nm under the condition of a light incident angle of −50° to 50°. In addition, the difference between the maximum value and the minimum value of the in-plane retardation ($R_o$) of the base layer may be 1.5 or less under the condition of a light incident angle of −50° to 50°. Specifically, the base layer may have a difference between the maximum value and the minimum value of the in-plane retardation ($R_o$) of 1.1 or less under the condition of a light incident angle of −50° to 50°.

The thickness direction retardation is a parameter defined by a product of an average of the two birefringences $\Delta n_{xz}$ (=$|n_x-n_z|$) and $\Delta n_{yz}$ (=$|n_y-n_z|$) on a cross-section in the film thickness direction and the film thickness d (nm). Here, the refractive indices may be values at a wavelength of 550 nm. For example, the thickness direction retardation ($R_{th}$) may be defined by the following Equation 2:

$$R_{th} = \{(n_x+n_y)/2 - n_z\} \times d \quad \text{[Equation 2]}$$

In the above equation, $n_x$ is the refractive index in the x-axis direction in the film plane, $n_y$ is the refractive index in the y-axis direction perpendicular to the x-axis in the film plane, $n_z$ is the refractive index in the thickness direction of the film, and d is the thickness (nm) of the film.

The base layer may have a ratio of the thickness direction retardation to the thickness ($R_{th}$/thickness) of 0 to 0.005. Specifically, the base layer may have a $R_{th}$/thickness of 0 to 0.001, $1\times10^{-5}$ to $1\times10^{-3}$, $1\times10^{-5}$ to $5\times10^{-4}$, or $1\times10^{-5}$ to $2\times10^{-4}$.

A degree of planar orientation is defined as a value obtained by dividing the thickness direction retardation ($R_{th}$) (nm) by the thickness thereof (nm). For example, the degree of planar orientation may be a value equal to a difference between the thickness direction refractive index ($n_z$) and an average of the plane refractive indices (($n_x+n_y$)/2) at a wavelength of 550 nm.

Other Properties

The base layer has a surface tension of 40 dynes/cm to 60 dynes/cm. If the base layer has a surface tension within the above range, an additional layer such as a primer coating layer can be readily laminated or coated on the surface thereof.

The base layer may have a haze of 0.1% to 1% after thermal treatment at 150° C. for 3 hours. Specifically, the base layer may have a haze of 0.1% to 0.9% or 0.1% to 0.8% after thermal treatment at 150° C. for 3 hours. In such event, the haze may be measured after the base layer has been cut to a size of 5 cm×5 cm×33 μm (width×length×thickness) and subjected to thermal treatment at 150° C. for 3 hours.

The base layer may have a shrinkage of 1% or less in the longitudinal direction and in the transverse direction, respectively, after treatment at 85° C. for 24 hours. Specifically, the base layer may have a shrinkage of 0.5% or less, 0.01% to 1%, 0.01% to 0.9%, or 0.05% to 1%, or 0.05% to 0.9%, in the longitudinal direction and in the transverse direction, respectively, after treatment at 85° C. for 24 hours. If the shrinkages after the thermal treatment are within the above ranges, it is possible to prevent light leakage or the like by preventing a cell from being warped in the fabrication of the cell after a polarizing plate has been prepared.

Additional Layer

The optical film may be a single layer composed of the base layer or may have a multilayer structure comprising an additional layer on at least one side of the base layer.

In an embodiment, the optical film may further comprise a primer coating layer on at least one side of the base layer.

The primer coating layer is not particularly limited as long as it can be applied to an optical film. For example, the primer coating layer may comprise at least one selected from the group consisting of polyester, polyurethane, and polyacrylate resins. Specifically, the primer coating layer may comprise a polyester resin or a polyurethane resin.

The thickness of the primer coating layer may be 50 nm to 100 nm or 60 nm to 80 nm.

Figure 2:
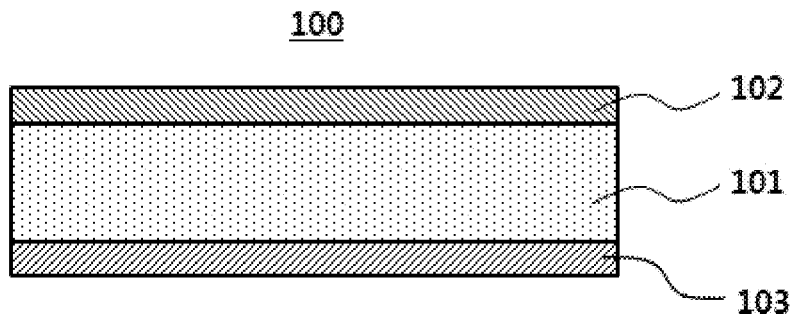

The structure of the optical film according to an embodiment is shown in FIGS. 1 and 2.

Referring to FIG. 1, the optical film (100) may comprise a base layer (101) and a primer coating layer (102) on one side of the base layer.

Referring to FIG. 2, the optical film (100) may comprise a base layer (101) and primer coating layers (102, 103) on both sides of the base layer.

The optical film may be used as a protective film for a polarizer.

Since the optical film satisfies the above-described physical properties, no polarization unevenness occurs when the film is observed from an upper and oblique direction or when a plurality of the films are superposed; and an additional layer can be readily laminated or coated on the surface thereof. Thus, since the optical film has improved optical characteristics and processability, it can be advantageously used in the fabrication of a polarizing plate.

Liquid Crystal Display Device

The liquid crystal display device according to an embodiment comprises a backlight unit and a liquid crystal panel, wherein the liquid crystal panel comprises an upper polarizing plate, a liquid crystal cell, and a lower polarizing plate in sequence, the upper polarizing plate and the lower polarizing plate each comprise a polarizer and protective films for a polarizer disposed on both sides of the polarizer, and at least one of the protective films for a polarizer is an optical film according to the above embodiment.

Figure 3:
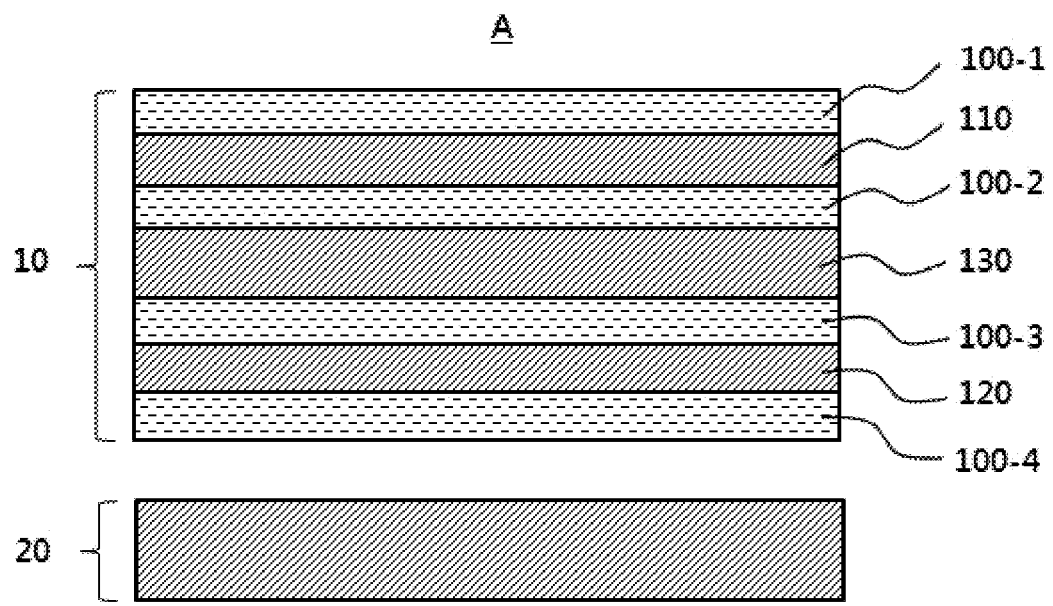
FIG. 3 is a cross-section of a liquid crystal display device according to the embodiments.

The liquid crystal display device according to an embodiment is shown in FIG. 3.

Referring to FIG. 3, the liquid crystal display device (A) comprises a liquid crystal panel (10) and a backlight unit (20). The liquid crystal panel (10) comprises an upper polarizing plate that comprises a polarizer (110) and protective films (100-1 and 100-2) for a polarizer disposed on both sides of the polarizer; a liquid crystal cell (130); and a lower polarizing plate that comprises a polarizer (120) and protective films (100-3 and 100-4) for a polarizer disposed on both sides of the polarizer in sequence.

The respective polarizers (110, 120) of the upper polarizing plate and the lower polarizing plate may be a polyvinyl alcohol (PVA) layer that has been dyed with iodine or the like. In such event, the polyvinyl alcohol molecules contained in the polyvinyl alcohol layer may be arrayed in one direction.

In addition, the respective protective films of the upper polarizing plate and the lower polarizing plate may be the optical film according to the embodiment as described above. That is, the optical film may be disposed in at least one of the positions: on the upper side (first position, 100-1) of the upper polarizing plate; between the upper polarizing plate and the liquid crystal cell (second position, 100-2); between the liquid crystal cell and the lower polarizing plate (third position, 100-3); and on the lower side (fourth position, 100-4) of the lower polarizing plate.

In general, when one type of film is applied to a plurality of positions selected from the first position to the fourth position, the optical characteristics may be deteriorated due to the features of the films caused by the superposition of the films. In this regard, the optical film according to the embodiment has an advantage of realizing excellent optical characteristics even when applied to a plurality of positions selected from the first position to the fourth position as it comprises the base layer, which satisfies the above-described physical properties.

As described above, the optical film may be a single layer composed of the base layer or may have a multilayer structure comprising the primer coating layer on at least one side of the base layer.

In an embodiment of the liquid crystal display device, the optical film (100) may be applied as the protective films (100-1 to 100-4) for a polarizer. In such event, the optical film may be disposed such that the primer coating layers (102 and 103) are interposed between the base layer (101) and the polarizers (110 and 120).

If the surface tension of the base layer (101) satisfies the above-described range, the primer coating layers (102 and 103) satisfy the above-described material, and the polarizer (11) is a polyvinyl alcohol (PVA) layer dyed with iodine or the like, the adhesiveness between the respective interfaces can be enhanced, while the excellent optical characteristics can be secured at the same time.

The liquid crystal display device of the embodiment is not limited to the above-described structure and can be variously modified as needed.

Process for Preparing an Optical Film

The process for producing an optical film according to an embodiment comprises (1) melt extruding a resin composition comprising a fluorine-based resin and an acrylic resin to prepare an unstretched sheet; (2) stretching the unstretched sheet by 2 to 3 times in the longitudinal direction and by 3 to 4 times in the transverse direction to produce a stretched film; and (3) heat setting the stretched film to produce a base layer, wherein the resin composition comprises the fluorine-based resin and the acrylic resin in a weight ratio of 1:9 to 1:99, and the base layer has an in-plane retardation ($R_o$) of 10 nm or less, a thickness direction retardation ($R_{th}$) of 50 nm or less, and a surface tension of 40 dynes/cm to 60 dynes/cm.

Step (1)

In this step, a resin composition comprising a fluorine-based resin and an acrylic resin is melt extruded to prepare an unstretched sheet.

The fluorine-based resin and the acrylic resin are as defined with respect to the optical film.

The resin composition comprises the fluorine-based resin and the acrylic resin in a weight ratio of 1:9 to 1:99. Specifically, the resin composition may comprise the fluorine-based resin and the acrylic resin in a weight ratio of 1:9 to 1:20, 1:10 to 1:20, or 1:15 to 1:20. If the mixing ratio of the fluorine-based and the acrylic resin is within the above range, it is possible to produce an effect of preventing poor processability that may be caused by the brittle characteristic of the acrylic resin and preventing a reduction in the retardations by a positive birefringence of the fluorine-based resin.

The resin composition may have amorphous (i.e., non-crystalline) characteristics. In addition, the melt extrusion may be carried out at 200° C. to 240° C., to which the melting temperature of the acrylic resin belongs. If the melt extrusion is carried out within the above temperature range, the resin can be readily melted, and the viscosity of the extrudate can be appropriately maintained.

Step (2)

In this step, the unstretched sheet is stretched by 2 to 3 times in the longitudinal direction and by 3 to 4 times in the transverse direction to produce a stretched film The stretching may be carried out such that the ratio of stretching in the transverse direction to stretching in the longitudinal direction is 1.1 to 1.5:1. Specifically, the stretching may be carried out such that the ratio of stretching in the transverse direction to stretching in the longitudinal direction is 1.15 to 1.5:1, 1.15 to 1.45:1, or 1.2 to 1.45:1.

In addition, the stretching may comprise (2-1) preheating the unstretched sheet at 50° C. to 110° C. or 50° C. to 70° C. while the sheet is moved at a speed of 5 m/min to 10 m/min; (2-2) stretching the preheated, unstretched sheet in the longitudinal direction at 100° C. to 120° C. while the sheet is moved at a speed of 10 m/min to 20 m/min; and (2-3) stretching the longitudinally stretched sheet in the transverse direction at 120° C. to 140° C. while the sheet is moved at a speed of 10 m/min to 20 m/min.

More specifically, the stretching may comprise (2-1) preheating the unstretched sheet at 50° C. to 70° C. while the sheet is moved at a speed of 5 m/min to 10 m/min; (2-2) thermally treating the preheated, unstretched sheet with a far-infrared radiation heater (R/H) at 600° C. to 650° C. and stretching the sheet by 2.3 to 3.0 times in the longitudinal direction at 100° C. to 120° C. and while the sheet is moved at a speed of 10 m/min to 20 m/min; and (2-3) stretching the longitudinally stretched sheet by 3.0 to 3.8 times in the transverse direction at 120° C. to 140° C. while the sheet is moved at a speed of 10 m/min to 20 m/min.

Meanwhile, the stretching may be carried out by applying a primer composition to the longitudinally stretched sheet to form a stretched film that comprises a primer coating layer. Specifically, the stretching may be carried out by applying a primer composition to the longitudinally stretched sheet in a thickness of 150 nm to 300 nm, drying the sheet, and then stretching the sheet in the transverse direction to produce a stretched film that comprises a primer coating layer. The coating thickness of the primer composition may be properly adjusted such that the thickness of the final primer coating layer is 60 nm to 80 nm.

Step (3)

In this step, the stretched film is heat set to produce a base layer.

The heat setting may be carried out at 150° C. to 170° C. for 1 to 2 minutes. Specifically, the heat setting may be carried out at 150° C. to 165° C. for 1 to 2 minutes. If the heat setting temperature is within the above range, it is more advantageous to produce a base film that has an in-plane retardation and a thickness direction retardation within the ranges desired in the embodiment.

The thickness of the base layer may be 100 μm or less. Specifically, the thickness of the base layer may be 20 μm to 80 μm.

Meanwhile, the process for producing an optical film may further comprise forming a primer coating layer on at least one side of the base layer.

The formation of the primer coating layer is not particularly limited as long as it is a conventional method of laminating a primer coating layer. For example, the primer coating layer may be formed by a method such as coating, lamination of a sheet, screen printing, or the like.

In an embodiment, the primer coating layer may be formed by an in-line coating method. Specifically, the primer coating layer may be formed by an in-line coating method during the stretching of an unstretched sheet in the above step (2).

More specifically, in the above step (2), a primer composition is applied to at least one side of the longitudinally stretched sheet, followed by stretching it in the transverse direction and drying it to produce a stretched sheet comprising a primer coating layer.

The primer composition may comprise at least one resin selected from the group consisting of a polyurethane resin, a polyester resin, a polyacrylate resin, and a combination thereof, and water. In such event, the primer composition may have a solids content of 5% by weight to 10% by weight based on the total weight of the composition, wherein the solids content may be the resin as described above. If the solids content of the primer composition is within the above range, the coatability and processability of the primer composition can be secured.

The coating thickness of the primer composition may be properly selected in consideration of the solids content of the primer composition, the target thickness of the final primer coating layer, and the stretching ratio in the transverse direction of the sheet. For example, the coating thickness of the primer composition may be determined by the following Equation 3. Here, the solids content may be a weight percentage value based on the total weight of the primer composition.

Coating thickness (nm) of a primer composition=thickness (nm) of a final primer coating layer×stretch ratio in the transverse direction×100(% by weight)/solids content (% by weight)  [Equation 3]

EXAMPLES

Hereinafter, the present invention is explained in detail by the following Examples. But the following Examples are intended to further illustrate the present invention. The scope of the present invention is not limited thereto only.

The raw materials used in the Examples and the Comparative Examples are as follows.

PMMA: poly(methyl methacrylate) with a melting index (MI) at 230° C. of 2.3 g/10 min and a softening point of 109° C. (manufacturer: LGMMA, brand name: IH830)

PVDF: polyvinylidene fluoride with 100% by mole of difluoroethylene, a weight average molecular weight of 224,000 g/mole, a melting index (MI) at 230° C. of 5.9 g/10 min, and a glass transition temperature of −32° C. (manufacturer: Solvay, brand name: solef1008)

Example 1

PMMA was dried at 90° C. for 6 hours, followed by sufficient mixing of 95% of the PMMA with 5% by weight of PVDF in a ribbon mixer to obtain a mixed resin. The mixed resin was melt extruded through an extruder at 230° C. and then cooled on a casting roll at 25° C. to prepare an unstretched sheet. The unstretched sheet was preheated at 60° C. while it was moved at a speed of 5 m/min. The preheated sheet was stretched by 2.5 times in the longitudinal direction (MD) while it was thermally treated at 650° C. on the upper side and at 600° C. on the upper side by a radiation heater (R/H) and it was moved at a speed of 13 m/min so that a base layer was obtained. A primer composition was applied to both sides of the base layer at the end of the longitudinally stretching step, and it was dried at 150° C. for 2 minutes to form a primer coating layer. The primer composition had been prepared by mixing 5% by weight of a polyurethane resin (manufacturer: DKS, brand name: SUPERFLEX 210) and 95% by weight of water. Thereafter, the film was stretched 3.0 times in the transverse direction (TD) at 127° C. while it was moved at a speed of 13 m/min, and it was heat set at a temperature of 150° C. for 80 seconds. As a result, an optical film in which a primer coating layer having a thickness of 80 nm was laminated on a base layer having a thickness of 33.8 μm was produced.

Examples 2 to 9 and Comparative Examples 1 to 4

Optical films were each prepared in the same manner as in Example 1, except that the weight ratio of PMMA to PVDF, the stretch ratios in the longitudinal direction (MD) and the transverse direction (TD), stretching temperature, stretching speed, heat setting temperature, or thickness of the base layer was changed as shown in Table 1 below.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Resin blending | PMMA | 95 | 95 | 95 | 95 | 95 | 95 | 95 |
| ratio (wt. %) | PVDF | 5 | 5 | 5 | 5 | 5 | 5 | 5 |
| Base layer thickness (μm) |  | 33.8 | 20.3 | 36.8 | 45.1 | 37.7 | 45.6 | 15.8 |
| MD | Stretch ratio | 2.5 | 2.5 | 2.5 | 2.5 | 2.5 | 2.5 | 2.8 |
| Stretching | Film moving speed (m/min) | 13 | 13 | 13 | 13 | 13 | 13 | 15 |
|  | Temp. (° C.) | 110 | 110 | 110 | 110 | 110 | 110 | 110 |

TABLE 1-continued

|  |  | Ex. 1 | Ex. 2 | Ex. 3 | Ex. 4 | Ex. 5 | Ex. 6 | Ex. 7 |
|---|---|---|---|---|---|---|---|---|
| TD stretching | Stretch ratio | 3.0 | 3.0 | 3.0 | 3.2 | 3.4 | 3.6 | 3.4 |
|  | Film moving speed (m/min) | 13 | 13 | 13 | 13 | 13 | 13 | 15 |
|  | Temp. (° C.) | 127 | 127 | 130 | 130 | 130 | 130 | 130 |
| TD stretch ratio/MD stretch ratio | | 1.20 | 1.20 | 1.20 | 1.28 | 1.36 | 1.44 | 1.21 |
| R/H temp. (upper/lower) (° C.) | | 650/600 | 650/600 | 650/600 | 650/600 | 650/600 | 650/600 | 650/600 |
| Heat setting temp. (° C.) | | 150 | 155 | 160 | 160 | 160 | 160 | 160 |

TABLE 2

|  |  | Ex. 8 | Ex. 9 | C. Ex. 1 | C. Ex. 2 | C. Ex. 3 | C. Ex. 4 |
|---|---|---|---|---|---|---|---|
| Resin blending ratio (wt. %) | PMMA | 95 | 90 | 100 | 100 | 100 | 100 |
|  | PVDF | 5 | 10 | 0 | 0 | 0 | 0 |
| Base layer thickness (μm) | | 36.8 | 42 | 54 | 48 | 38 | 68 |
| MD Stretching | Stretch ratio | 2.8 | 2.8 | 2.5 | 2.5 | 2.6 | — |
|  | Film moving speed (m/min) | 15 | 15 | 13 | 13 | 14 | 5 |
|  | Temp. (° C.) | 110 | 110 | 110 | 110 | 110 | — |
| TD stretching | Stretch ratio | 3.6 | 3.2 | 3.0 | 3.2 | 3.0 | — |
|  | Film moving speed (m/min) | 15 | 15 | 13 | 13 | 14 | 5 |
|  | Temp. (° C.) | 130 | 130 | 130 | 130 | 130 | — |
| TD stretch ratio/MD stretch ratio | | 1.29 | 1.14 | 1.20 | 1.28 | 1.15 | — |
| R/H temp. (upper/lower) (° C.) | | 650/600 | 650/600 | 650/600 | 650/600 | 650/600 | — |
| Heat setting temp. (° C.) | | 160 | 140 | 150 | 150 | 150 | — |

Test Example: Measurement of Properties

The base layers of the optical films prepared in the same manner as in Examples 1 to 9 and Comparative Examples 1 to 4 were each evaluated as follows. The results are shown in Tables 3 and 4 below and FIGS. 4 to 6.

(1) In-Plane Retardation ($R_o$)

The films each were cut into a rectangle in a size of 4 cm×2 cm in the transverse direction of the film regardless of the orientation axis direction of the film, which was used as a measurement sample. The sample was measured for the refractive indices ($n_x$ and $n_y$) in two mutually perpendicular directions and the refractive index ($n_z$) in the thickness direction with an Abbe refractometer (NAR-4T available from Atago Co., Ltd.; measurement wavelength of 550 nm). The absolute value ($|n_x-n_y|$) of the difference in the refractive indices in the two orthogonal directions was referred to as an anisotropy ($\Delta n_{xy}$) of the refractive indices. The thickness d (nm) of the film was measured with an electronic micrometer (Millitron 1245D available from Feinpruf GmbH), which was converted to nm units. The in-plane retardation ($R_o$) was determined as a product ($\Delta n_{xy} \times d$) of the anisotropy ($\Delta n_{xy}$) of the refractive indices and the thickness of the film d (nm).

(2) Thickness Direction Retardation ($R_{th}$)

The films were each measured for the refractive indices $n_x$, $n_y$, and $n_z$ and the thickness d (nm) in the same manner as in the above measurement of the in-plane retardation. The average value of ($\Delta n_{xz} \times d$) and ($\Delta n_{yz} \times d$) was calculated to determine the thickness direction retardation ($R_{th}$).

(3) Haze

The films were each cut into a size of 5 cm×5 cm and thermally treated in an oven at 150° C. for 3 hours. The haze after the thermal treatment was measured using a haze measuring instrument (NDH-5000W, Nippon Denkoku Kogyo).

Figure 4:
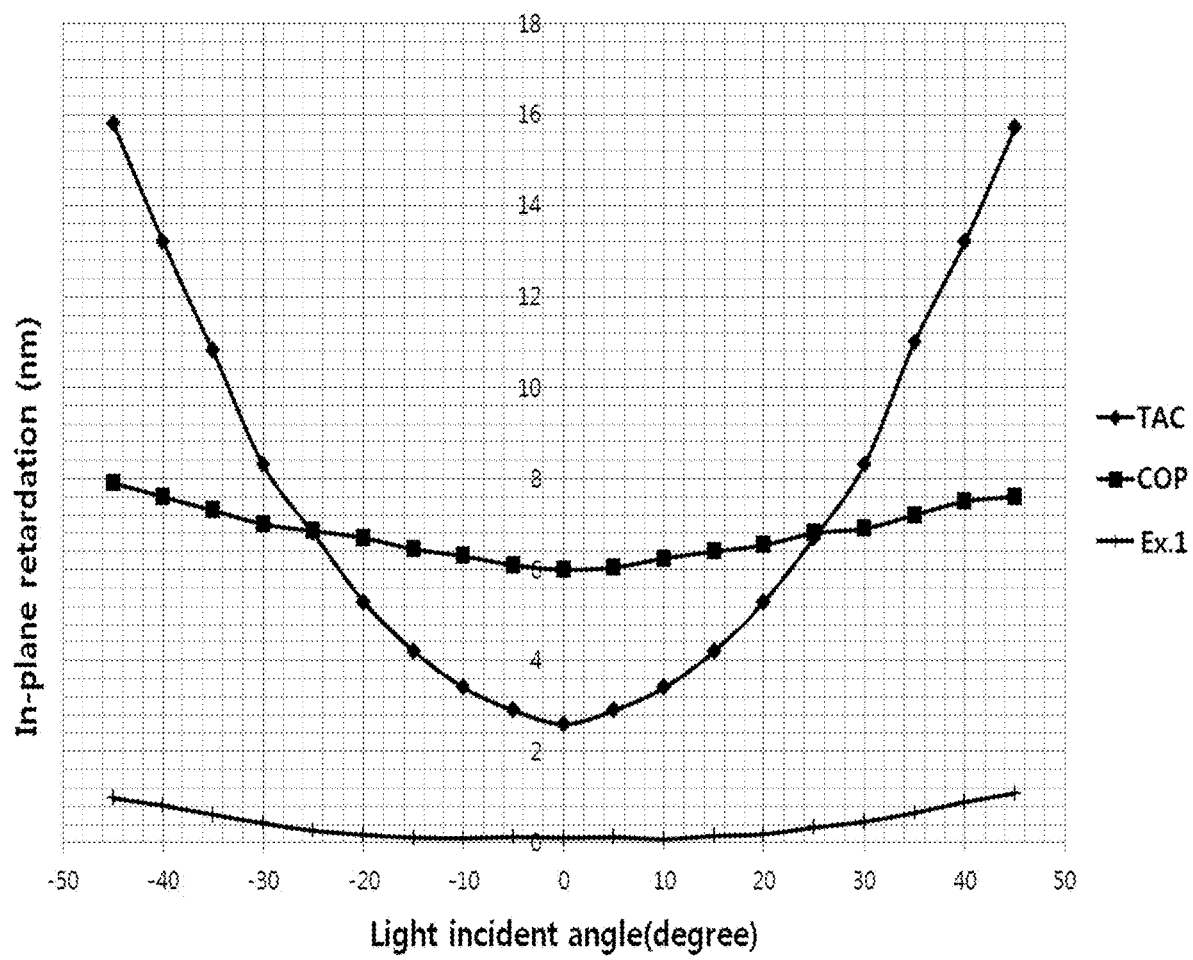
FIG. 4 is a graph showing a change in the in-plane retardation of an optical film of Example 1, a TAC film, and a COP film with respect to a change in the light incident angle.

(4) Changes in in-Plane Retardation with Respect to Changes in Light Incident Angle The in-plane retardation of each film was measured in the same manner as in Section (1) above, except that the incident angle of irradiation light was adjusted. A TAC film (manufacturer: Fuji, brand name; n-tac, thickness: 40 μm) and a COP film (manufacturer: Zeon, brand name. Zeoner, thickness: 25 μm) were used as a control group. The results are shown in FIG. 4.

(5) Polarization Unevenness

The optical films of Example 1 and that of Comparative Example 1 were each interposed between two polarizing plates (manufacturer: Samsung SDI), followed by evaluation of the color. The measurement results are shown in FIGS. 5 and 6.

Figure 5:
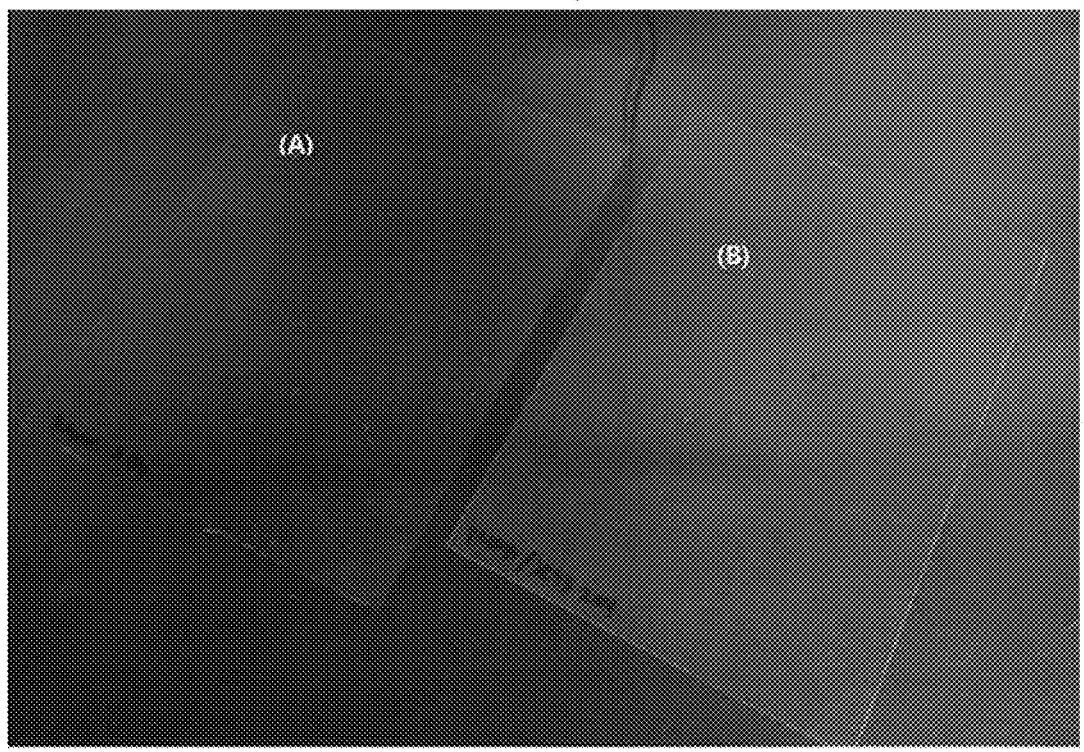
FIGS. 5 and 6 are the results of evaluating the polarization unevenness of the optical films of Example 1 and Comparative Example 1.

In FIG. 5, (A) shows the result of the case where one film of Comparative Example 1 was laminated, and (B) shows the result of the case where two films of Example 1 were laminated.

Figure 6:
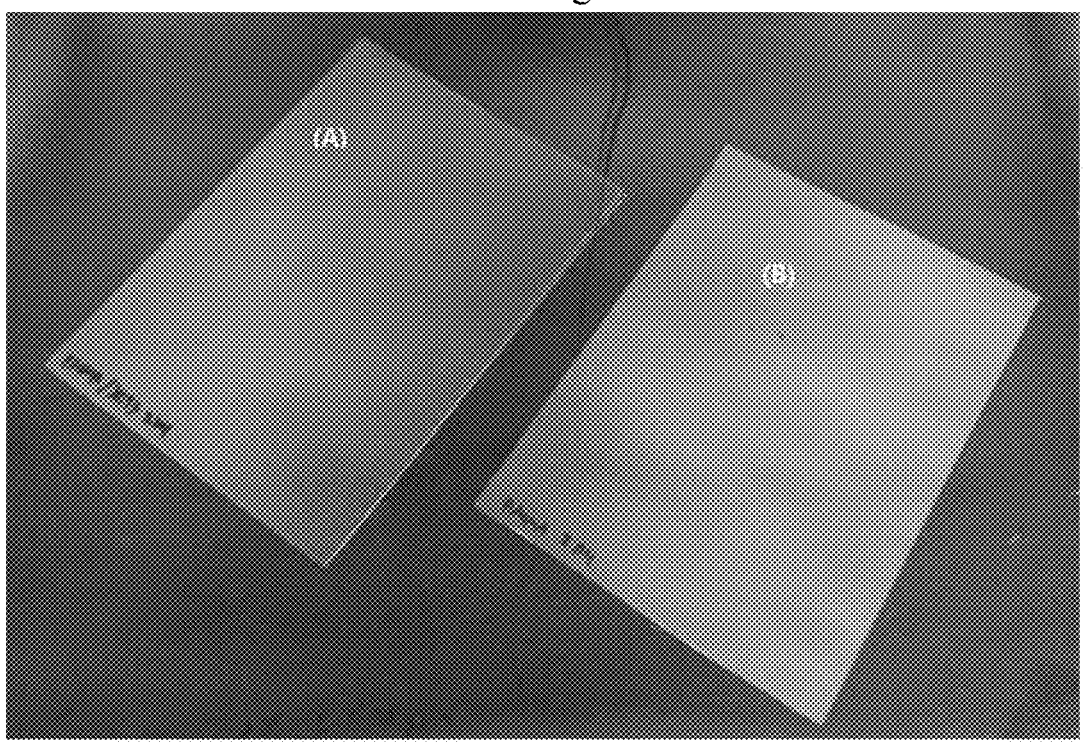

In FIG. 6, (A) shows the result of the case where two films of Example 1 were laminated, and (B) shows the result of the case where two films of Comparative Example 1 were laminated.

(6) Total Luminous Transmittance

The base layers prepared in Examples 1 to 9 and those prepared in Comparative Examples 1 to 4 were each measured for the total luminous transmittance using a measuring instrument (NDH-5000W, Nippon Denkoku Kogyo).

(7) Surface Tension

The base layers prepared in Examples 1 to 9 and those prepared in Comparative Examples 1 to 4 were each measured for the surface tensions using a PHOENIX-300 TOUCH from SEO (Surface Electro Optics Corporation).

(8) Observation of Rainbow

One or two of the optical films prepared in Examples 1 to 9 and Comparative Examples 1 to 4 were interposed between two polarizing plates (manufacturer: Samsung SDI)

to produce a laminate. Thereafter, the rainbow phenomenon of the film was observed while the angle between the viewer and the laminate was varied from 45° to 10°.

(9) Evaluation of Color

One or two of the base films prepared in Examples 1 to 9 and Comparative Examples 1 to 4 were superposed, followed by observation by the naked eyes. If gray color was seen, it was evaluated "present." If it was seen as transparent, it was evaluated as "absent."

TABLE 3

| | Thickness | Retardation | | | | Rainbow* | |
|---|---|---|---|---|---|---|---|
| | (μm) | $R_o$ | $R_{th}$ | $n_z$ ($R_{th}/R_o$) | $R_{th}$/thickness | 1 film | 2 films |
| Ex. 1 | 33.8 | 2.954 | 3.696 | 1.3748 | 0.0001093 | A | A |
| Ex. 2 | 20.3 | 3.067 | 2.147 | 0.5497 | 0.0001058 | A | A |
| Ex. 3 | 36.8 | 0.907 | 2.121 | 3.0224 | 0.0000576 | A | A |
| Ex. 4 | 45.1 | 1.758 | 2.295 | 1.4243 | 0.0000509 | A | A |
| Ex. 5 | 37.7 | 2.025 | 1.935 | 0.9526 | 0.0000513 | A | A |
| Ex. 6 | 45.6 | 2.47 | 2.308 | 0.9003 | 0.0000506 | A | A |
| Ex. 7 | 15.8 | 2.194 | 1.756 | 0.7008 | 0.0001111 | A | A |
| Ex. 8 | 36.8 | 1.069 | 2.135 | 2.5189 | 0.0000580 | A | A |
| Ex. 9 | 42 | 4.58 | 13.1 | 2.6 | 0.0003095 | A | A |
| C. Ex. 1 | 54 | 40.00 | −45 | −1.125 | −0.0008333 | A | SV |
| C. Ex. 2 | 48 | 12.00 | −18 | −1.5 | −0.0003750 | A | SV |
| C. Ex. 3 | 38 | 60.50 | −20 | −0.335537 | −0.0005342 | A | SV |
| C. Ex. 4 | 68 | 28.00 | −121 | −4.3214286 | −0.0017794 | SV | SV |

*A: absent, SV: slightly visible

TABLE 4

| | Thickness | Haze | Total luminous transmittance | Shrinkage (%) | | Surface tension | Color* | |
|---|---|---|---|---|---|---|---|---|
| | (μm) | (%) | (%) | MD | TD | (dyne/cm) | 1 film | 2 films |
| Ex. 1 | 33.8 | 0.5 | 92.99 | 0.4 | 0.9 | 54.2 | A | A |
| Ex. 2 | 20.3 | 0.6 | 93.08 | 0.2 | 0.7 | 48.3 | A | A |
| Ex. 3 | 36.8 | 0.5 | 92.88 | 0.4 | 0.6 | 40.3 | A | A |
| Ex. 4 | 45.1 | 0.6 | 92.81 | 0.3 | 0.3 | 45.2 | A | A |
| Ex. 5 | 37.7 | 0.6 | 93.02 | 0.3 | 0.6 | 42.6 | A | A |
| Ex. 6 | 45.6 | 0.6 | 92.85 | 0.5 | 0.6 | 58.1 | A | A |
| Ex. 7 | 15.8 | 0.5 | 92.99 | 0.2 | 0.4 | 48.2 | A | A |
| Ex. 8 | 36.8 | 0.5 | 93.04 | 0.15 | 0.05 | 56.2 | A | A |
| Ex. 9 | 42 | 0.38 | 93.12 | 5.3 | 14.5 | 51.3 | A | A |
| C. Ex. 1 | 54 | 0.6 | 92.9 | 0.9 | 1.2 | 25.5 | A | P |
| C. Ex. 2 | 48 | 0.5 | 93.3 | 0.6 | 0.9 | 33.2 | A | P |
| C. Ex. 3 | 38 | 0.4 | 93.03 | 0.7 | 1.1 | 38.4 | A | P |
| C. Ex. 4 | 68 | 0.48 | 93.08 | 7.8 | 12.5 | 25.5 | P | P |

*A: absent, P: present

As can be seen from Tables 3 and 4, the base layers of Examples 1 to 9 each had excellent optical characteristics in which the in-plane retardation ($R_o$) and the thickness direction retardation ($R_{th}$) were at least 0 but small, and the $n_z$ ($R_{th}/R_o$) and the degree of planar orientation ($R_{th}$/thickness) were greater than 0 In addition, the base layers of Examples 1 to 9 each had a low haze and a low shrinkage of as low as 1% or lower both in the longitudinal direction (MD) and in the transverse direction (TD) after the thermal treatment, resulting in excellent reliability. Further, the base layers of Examples 1 to 9 each had a high total luminous transmittance and a surface tension of 40 dynes/cm to 60 dynes/cm. Thus, a primer coating layer was uniformed laminated on the surface of the base layer without defects, resulting in excellent processability, and the adhesion between the base layer and the primer coating layer was excellent.

In contrast, the base layers prepared in Comparative Examples 1 to 4 each had an in-plane retardation, a thickness direction retardation, an $n_z$ ($R_{th}/R_o$), a degree of planar orientation ($R_{th}$/thickness), a shrinkage after the thermal treatment, or a surface tension, any of which fell outside the desired range, resulting in polarization unevenness, poor reliability, or poor processability at the time of laminating a primer coating layer.

As can be seen from FIG. 4, the optical film of Example 1 had almost no changes in the in-plane retardation with respect to the incident angle of light as compared with the TAC film and the COP film.

As can be seen from FIGS. 5 and 6 and Tables 3 and 4, even when a plurality of the optical films of Examples 1 to 9 were interposed between polarizing plates, the color variation was small, and even when a plurality thereof were superposed, neither a rainbow phenomenon nor gray color was observed. Especially, in FIG. 6, (A) shows that even when two optical films of Example 1 were interposed between two polarizing plates, it was transparent. In contrast, (B) shows that when two optical films of Comparative Example 1 were interposed between two polarizing plates, the transparency thereof was deteriorated.

The invention claimed is:

1. An optical film, which comprises a base layer comprising a fluorine-based resin and an acrylic resin in a weight ratio of 1:10 to 1:20, wherein the base layer has an in-plane retardation ($R_o$) of 10 nm or less at a wavelength of 550 nm, a thickness direction retardation ($R_{th}$) of 50 nm or less at a wavelength of 550 nm, and a surface tension of 40 dynes/cm to 60 dynes/cm, wherein the fluorine-based resin is at least one selected from the group consisting of an ethylene-tetrafluoroethylene (ETFE) copolymer, a polyvinylidene fluoride (PVDF) homopolymer or copolymer, a tetrafluoroethylene-hexafluoropropylene (FEP) copolymer, a tetrafluoroethylene-hexafluoropropylene-vinylidene fluoride (THV) copolymer, and a polychlorotrifluoroethylene (PCTFE or PTFCE) copolymer, wherein the fluorine-based resin has a viscosity of 100 to 2,500 Pa·s, as measured by a capillary flow meter under the conditions of a shear rate of 100 s$^{-1}$ and 230° C., and wherein the base layer has a ratio of stretching in the transverse direction to stretching in the longitudinal direction of 1.1 to 1.5:1, and wherein the optical film further comprises a primer coating layer on at least one side of the base layer, and the primer coating layer comprises at least one selected from the group consisting of polyester, polyurethane, and polyacrylate resins.

2. The optical film of claim 1, wherein the base layer has a thickness of 100 µm or less.

3. The optical film of claim 1, wherein the acrylic resin is a homopolymer.

4. The optical film of claim 3, wherein the acrylic resin is a poly (methyl methacrylate) (PMMA).

5. The optical film of claim 1, wherein the base layer has an in-plane retardation ($R_o$) of 0.1 nm to 10 nm and a thickness direction retardation ($R_{th}$) of 1 nm to 40 nm, wherein the ratio of $R_{th}/R_o$ is 0.1 to 40.

6. The optical film of claim 1, wherein the base layer has a ratio of the thickness direction retardation to the thickness ($R_{th}$/thickness) of 0 to 0.005.

7. The optical film of claim 1, wherein the base layer has an in-plane retardation ($R_o$) of 3 nm or less under the condition of a light incident angle of −50° to 50°.

8. The optical film of claim 1, wherein the difference between the maximum value and the minimum value of the in-plane retardation ($R_o$) of the base layer is 1.5 or less under the condition of a light incident angle of −50° to 50°.

9. The optical film of claim 1, wherein the base layer has a haze of 0.1% to 1% after thermal treatment at 150° C. for 3 hours.

10. The optical film of claim 1, wherein the base layer has a shrinkage of 1% or less in a longitudinal direction and in a transverse direction, respectively, after treatment at 85° C. for 24 hours.

11. The optical film of claim 1, which is used as a protective film for a polarizer.

12. A liquid crystal display device, which comprises a backlight unit and a liquid crystal panel, wherein the liquid crystal panel comprises an upper polarizing plate, a liquid crystal cell, and a lower polarizing plate in sequence, the upper polarizing plate and the lower polarizing plate each comprise a polarizer and protective films for a polarizer disposed on both sides of the polarizer, and at least one of the protective films for a polarizer is an optical film according to claim 1.

* * * * *